(12) United States Patent
Jin et al.

(10) Patent No.: US 8,773,809 B2
(45) Date of Patent: Jul. 8, 2014

(54) SYSTEMS AND METHODS FOR MEDIUM PROXIMITY DETECTION IN A READ CHANNEL

(71) Applicant: LSI Corporation, Milpitas, CA (US)

(72) Inventors: Ming Jin, Fremont, CA (US); Erich F. Haratsch, Bethlehem, PA (US); Jason S. Goldberg, St. Paul, MN (US); Kurt J. Worrell, Berthoud, CO (US); Scott M. Dziak, Fort Collins, CO (US); Jeffrey P. Grundvig, Loveland, CO (US)

(73) Assignee: LSI Corporation, San Jose, CA (US)

( * ) Notice: Subject to any disclaimer, the term of this patent is extended or adjusted under 35 U.S.C. 154(b) by 36 days.

(21) Appl. No.: 13/690,435

(22) Filed: Nov. 30, 2012

(65) Prior Publication Data

US 2013/0148230 A1    Jun. 13, 2013

Related U.S. Application Data

(63) Continuation-in-part of application No. 13/031,671, filed on Feb. 22, 2011, now Pat. No. 8,630,055.

(51) Int. Cl.
*G11B 21/02* (2006.01)

(52) U.S. Cl.
USPC ............... 360/75; 360/31; 360/39; 360/77.02

(58) Field of Classification Search
None
See application file for complete search history.

(56) References Cited

U.S. PATENT DOCUMENTS

| | | | | |
|---|---|---|---|---|
| 6,038,091 A * | 3/2000 | Reed et al. | ...................... | 360/46 |
| 6,092,412 A * | 7/2000 | Flechsig et al. | ................. | 73/105 |
| 6,310,739 B1 * | 10/2001 | McEwen et al. | ................ | 360/25 |
| 6,671,111 B2 * | 12/2003 | Ottesen et al. | .................. | 360/31 |
| 6,674,590 B2 * | 1/2004 | Ottesen et al. | .................. | 360/31 |
| 7,199,956 B1 * | 4/2007 | Moser et al. | .................... | 360/46 |
| 7,872,821 B2 * | 1/2011 | Grundvig et al. | ............... | 360/25 |
| 8,018,669 B2 * | 9/2011 | Ehrlich et al. | .................. | 360/31 |
| 8,089,719 B1 * | 1/2012 | Dakroub | ......................... | 360/75 |
| 8,259,406 B2 * | 9/2012 | Kazusawa et al. | .............. | 360/46 |
| 2007/0127148 A1 * | 6/2007 | Yokohata et al. | ............... | 360/31 |
| 2008/0192379 A1 * | 8/2008 | Kurita et al. | .................... | 360/75 |

* cited by examiner

*Primary Examiner* — Dismery Mercedes
(74) *Attorney, Agent, or Firm* — Ryan, Mason & Lewis, LLP

(57) ABSTRACT

A contact event between a sensing device and a storage medium is detected by receiving a signal indicating a physical proximity between the sensing device and the storage medium; generating a plurality of frequency bin outputs; comparing one or more frequency bin outputs to a corresponding first level threshold to yield a corresponding comparator output; summing the comparator output with at least one prior instance of the comparator output to yield an aggregated value; comparing the aggregated value to an aggregate threshold to yield an aggregate output; and generating a contact event output if one or more of a first group of the plurality of frequency bin outputs has an associated aggregate output set to a predefined binary value and a predefined minimum number of a second group of the plurality of frequency bin outputs has an associated aggregate output set to a predefined binary value.

25 Claims, 5 Drawing Sheets

SYSTEMS AND METHODS FOR MEDIUM PROXIMITY DETECTION IN A READ CHANNEL

CROSS-REFERENCE TO RELATED APPLICATION

This application is a continuation-in-part application of U.S. patent application Ser. No. 13/031,671, filed Feb. 22, 2011, entitled "Systems and Methods for Medium Contact Detection," (now U.S. Pat. No. 8,630,055), incorporated by reference herein.

BACKGROUND

Various electronic storage media are accessed using a read/write head assembly that is positioned in relation to a storage medium. The read/write head assembly is supported by a head actuator, and reads information from the storage medium and writes information to the storage medium. The distance between the read/write head assembly and the storage medium is typically referred to as the fly height. In order to increase the recording density in hard disk drives (HDDs) and other storage systems, the physical spacing between the read/write head assembly and the storage medium has been reduced to 2 nm or less.

Control of the fly height is thus important for proper operation of a storage system. In particular, increasing the distance between the read/write head assembly and the storage medium typically increases intersymbol interference, which may impair the ability to properly read the information that was originally written to the storage medium. A fly height that is too small, on the other hand, can result in excessive wear on the read/write head assembly and/or a premature destruction of the storage device.

At times, the read/write head assembly may come into contact with the storage medium resulting in potential impairment of the data integrity, as well as possible damage to the storage medium and/or the read/write head assembly. A number of techniques have been proposed or suggested for detecting contact between a read/write head assembly and the storage medium. For example, U.S. patent application Ser. No. 13/031,671, filed Feb. 22, 2011, entitled "Systems and Methods for Medium Contact Detection," incorporated by reference herein, discloses systems and methods for detecting contact between a read/write head assembly and the storage medium in the digital domain.

Nonetheless, a need remains for improved techniques for detecting contact between a read/write head assembly and the storage medium in the digital domain.

SUMMARY

Generally, systems and methods are provided for detecting a contact event between a read/write head assembly and a storage medium. According to one embodiment of the invention, a contact event between a sensing device and a storage medium is detected by receiving a signal operable to indicate a physical proximity between the sensing device and the storage medium; processing a data set derived from the signal to generate a plurality of frequency bin outputs; comparing one or more frequency bin outputs to a corresponding level threshold to yield a corresponding comparator output; summing the comparator output with at least one prior instance of the comparator output to yield an aggregated value; comparing the aggregated value to an aggregate threshold to yield an aggregate output; and generating a contact event output if one or more of a first group of the plurality of frequency bin outputs has an associated aggregate output set to a predefined binary value and a predefined minimum number of a second group of the plurality of frequency bin outputs has an associated aggregate output set to a predefined binary value.

A more complete understanding of the present invention, as well as further features and advantages of the present invention, will be obtained by reference to the following detailed description and drawings.

BRIEF DESCRIPTION OF THE DRAWINGS

FIG. 1b shows the read/write head assembly of FIG. 1a disposed in relation to the disk platter of FIG. 1a;

DETAILED DESCRIPTION

Embodiments of the invention are related to systems and methods for transferring information to and from a storage medium, and more particularly to systems and methods for detecting a contact event between a sensor and the storage medium. According to one embodiment of the invention, an Advanced Head-Disk Interface (AHDI) algorithm is provided for use in a read channel to detect a contact or touchdown (TD) event between the read/write sensor and the storage medium.

Various embodiments of the invention provide for a digital domain read channel circuit that measures various types of contact signatures provided via a head disk interface sensor. As used herein, the phrase "contact signature" is used in its broadest sense to mean a value or series of values indicating a predefined proximity and/or contact between a sensor and a sensed element. In some embodiments of the invention, the contact signatures are frequencies or frequency signatures indicative of contact or predefined proximity of the sensor and sensed element. As used herein, the term "contact event" shall include contact and/or a predefined proximity between the sensor and the sensed element. The read channel circuit utilizes filtering and detection techniques to yield increased contact detection accuracy. In one particular embodiment of the invention, a contact event between the read/write head assembly and the storage medium is detected and characterized using a variety of digital signal processing techniques. Such digital signal processing techniques may include, but are not limited to, processing a signal received from the head disk interface sensor through multiple frequency bins with different center frequencies, determined by the particular signature of the head disk interface sensor. In one exemplary embodiment, the multiple frequency bins are obtained using a Discrete Fourier Transform (DFT) scheme. In another variation, the multiple frequency bins can be obtained using a plurality of band pass filters.

In one or more embodiments of the invention, circuits or an instruction driven processor are used to weight each output from the aforementioned multiple frequency bins according to a specific criteria determined to maximize positive contact detection while minimizing false positives from non-contact events. In particular embodiments of the invention, the aforementioned weighting process is trained or calibrated during an initial calibration phase. Various embodiments of the invention rely on a multi-level thresholding scheme, such as a three-level thresholding scheme, that qualifies an initial amplitude-based threshold detection with an additional sliding-window threshold. As used herein, the term "derivative" is used in its broadest sense to mean something derived from something else. Hence, a first signal derived from a second signal may be the same as the second signal or may be the second signal that has been processed to some level.

Figure 1A:
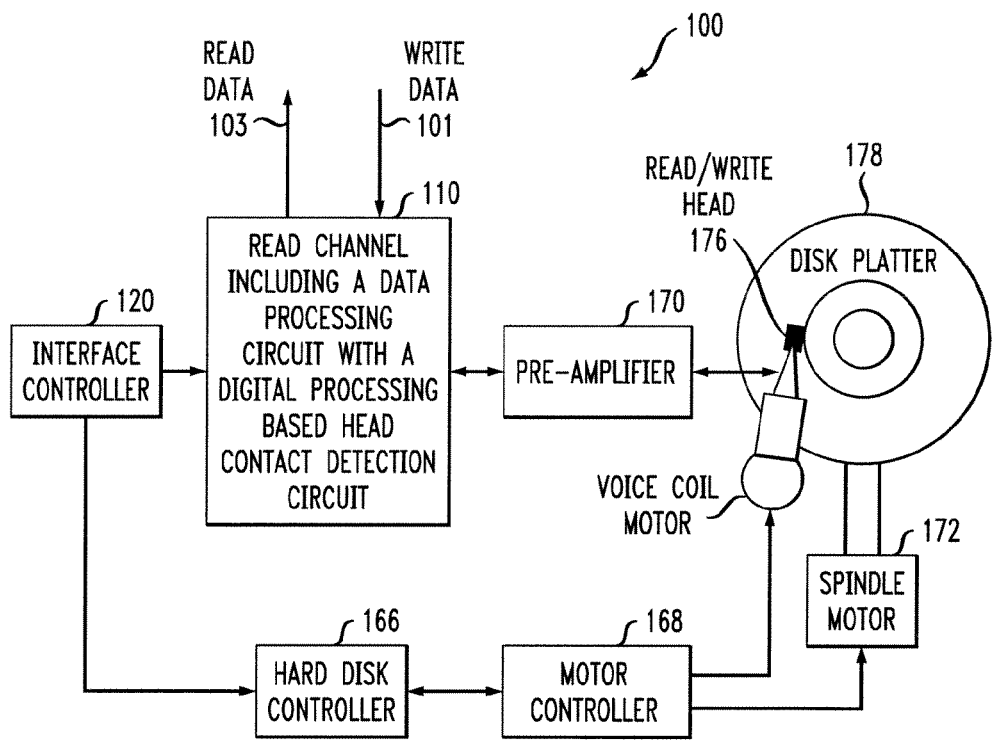
FIG. 1a depicts a storage device including a read channel that includes a data processing circuit with a digital processing based head contact detection circuit in accordance with one or more embodiments of the invention.

FIG. 1a illustrates an exemplary storage device 100 including a read channel circuit 110 having a data processing circuit with a digital processing-based head contact detection circuit. Storage device 100 may be, for example, a hard disk drive. Read channel circuit 110 includes a digital processing-based head contact detection circuit that may be implemented consistent with that discussed below in conjunction with FIG. 2. Further, read channel circuit 110 may include a data detector, such as, for example, a Viterbi algorithm data detector, and/or a data decoder circuit, such as, for example, a low density parity check decoder circuit. In addition to read channel circuit 110, storage device 100 includes a read/write head assembly 176 disposed in relation to a disk platter 178. Read/write head assembly 176 is operable to sense information stored on disk platter 178 and to provide a corresponding electrical signal to read channel circuit 110.

Storage device 100 also includes an interface controller 120, a hard disk controller 166, a motor controller 168, a pre-amplifier 170 and a spindle motor 172. The pre-amplifier 170 includes a fly height control driver (not shown). Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with a perpendicular recording scheme. In other embodiments of the invention, disk platter 178 includes magnetic signals recorded in accordance with a longitudinal recording scheme. In further variations, the magnetic signals can be recorded in accordance with Heat Assisted Magnetic Recording (HAMR) or Bit Patterned Media Recording (BPMR) techniques. Motor controller 168 controls the spin rate of disk platter 178 and the location of read/write head assembly 176 in relation to disk platter 178.

Figure 1B:
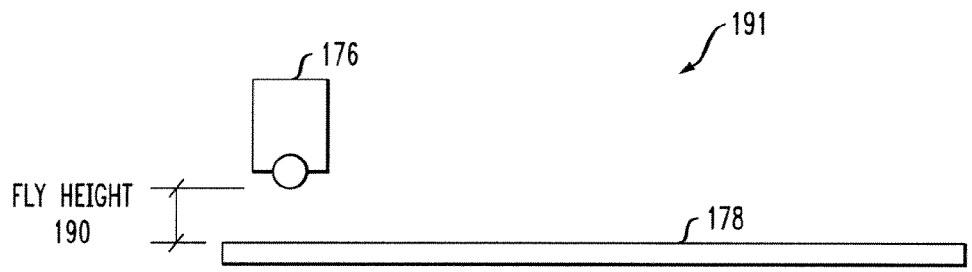

As shown in a cross sectional diagram 191 of FIG. 1b, the distance between read/write head assembly 176 and disk platter 178 is a fly height 190. Fly height 190 is controlled by motor controller 168 and read channel 110 based upon information provided from the digital processing based head contact detection circuit.

In a typical read operation, read/write head assembly 176 is accurately positioned by motor controller 168 over a desired data track on disk platter 178. Motor controller 168 positions read/write head assembly 176 in relation to disk platter 178, and drives spindle motor 172 by moving read/write head assembly 176 to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous analog signal representative of the magnetic data on disk platter 178. This continuous analog signal is provided by read/write head assembly 176 to read channel circuit 110. In turn, read channel circuit 110 digitizes and decodes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

It should be noted that storage system 100 may be integrated into a larger storage system such as, for example, a RAID (redundant array of inexpensive disks or redundant array of independent disks) based storage system. It should also be noted that various functions or blocks of storage system 100 may be implemented in either software or firmware, while other functions or blocks are implemented in hardware.

Figure 2:
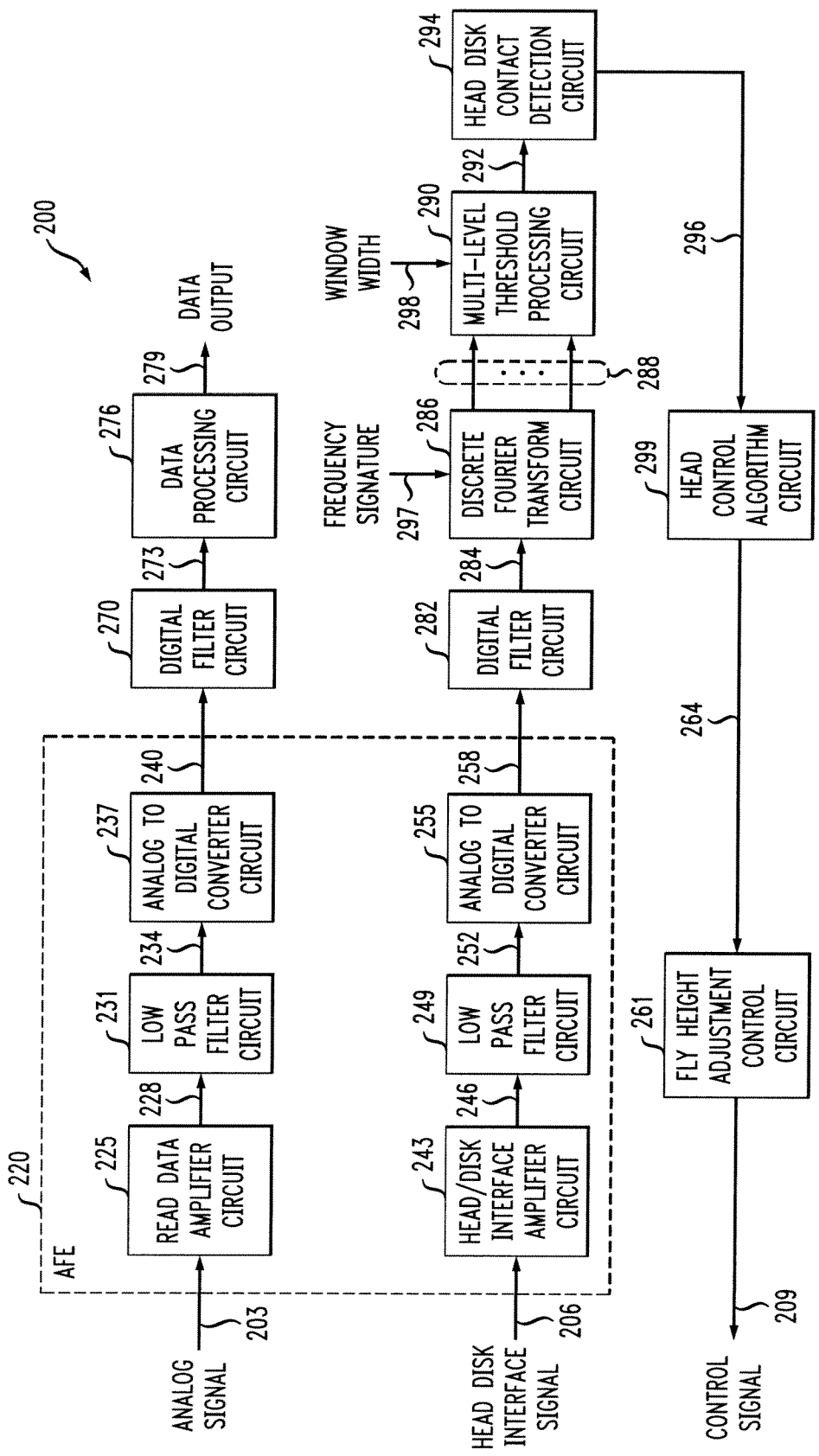
FIG. 2 depicts a contact detection system in accordance with various embodiments of the invention.

FIG. 2 illustrates a contact detection system 200 in accordance with various embodiments of the invention. Contact detection system 200 includes an analog front end circuit 220 that interfaces to a read/write head assembly (not shown in FIG. 2) and a head disk interface circuit (not shown). Analog front end circuit 220 includes a read data amplifier circuit 225 that receives an analog input signal 203. Analog input signal 203 is provided by a read/write head assembly 176 (not shown in FIG. 2) that senses information on a storage medium 178 (not shown). Read data amplifier circuit 225 amplifies the received input signal 203 and provides an amplified output 228. Read data amplifier circuit 225 may be any circuit known in the art that is capable of amplifying an analog input signal. Amplified output 228 is provided to a low pass filter circuit 231 that provides a corresponding filtered output 234. Low pass filter circuit 231 may be any circuit known in the art that is capable of filtering an analog signal. Filtered output 234 is provided to an analog to digital converter circuit 237 that provides a corresponding series of digital samples 240. Analog to digital converter circuit 237 may be any circuit known in the art that is capable of converting a continuous time signal to a series of sample values.

In addition, analog front end circuit 220 includes a head/disk interface amplifier circuit 243 that receives a head disk interface signal 206. In some embodiments of the invention, head disk interface signal 206 is a varying voltage caused by passing a constant current through an element whose resistance is proportional to temperature. Where the read/write head assembly 176 contacts the storage medium 178, the friction results in a change in temperature that is detectable by monitoring head disk interface signal 206. Head disk interface signal 206 is provided by a head/disk interface circuit (not shown) that senses contact between a read/write head assembly and a storage medium. Of note, in some implementations, analog signal 203 and head disk interface signal 206 are interfaces to the read/write head assembly 176 via a preamplifier circuit. Head disk interface amplifier circuit 243 amplifies the received input and provides an amplified output 246. Head disk interface amplifier circuit 206 may be any circuit known in the art that is capable of amplifying an analog input signal. Amplified output 246 is provided to a low pass filter circuit 249 that provides a corresponding filtered output 252. Low pass filter circuit 249 may be any circuit known in the art that is capable of filtering an analog signal. In some cases, low pass filter circuit 249 includes an anti-aliasing filter (preparation for sampling), a programmable amplifier (ensure signal is scaled properly for the ADC), and a sample and hold circuit that holds the signal in preparation for processing by an analog to digital converter circuit 255 to which filtered output 252 is applied. Analog to digital converter circuit 255 provides a corresponding series of digital samples 258. Analog to digital converter circuit 255 may be any circuit known in the art that is capable of converting a continuous time signal to a series of sample values.

In some embodiments of the invention, filtered output 252 is passed to analog to digital converter circuit 255 via a differential pair. In some cases, head disk interface amplifier circuit 243 and low pass filter circuit 249 are implemented in or near the read/write head assembly 176, and analog to digital converter circuit 255 is implemented as part of a digital read channel circuit along with analog to digital converter circuit 237, digital filter circuit 270 and data processing circuit 276. In some cases, filtered output 252 may be passed between the read/write head assembly 176 and the digital read channel circuit via a set of dedicated pins on the read/write head assembly 176 and/or the digital read channel circuit, or by multiplexing filtered output 252 onto existing I/O (e.g., the Reader lines, the Serial Port lines, or the Writer lines). Of note, head disk interface signal 206 may be either single ended or differential. Where the head disk interface signal 206 is single ended, single ended circuitry will be used for processing, and where the head disk interface signal 206 is differential, the processing circuitry may be differential.

Contact detection system 200 includes a fly height adjustment control circuit 261 that provides a control signal 209 to the read/write head assembly 176 (not shown in FIG. 2). Control signal 209 causes a fly height 190 between the read/write head assembly 176 and a storage medium 178 to be adjusted. Control signal 209 corresponds to a head control input 264. Fly height adjustment control circuit 261 may be any circuit known in the art that is capable of adjusting the fly height control. In some cases, fly height adjustment control circuit 261 is implemented as part of a preamplifier circuit (not shown).

Digital samples 240 are provided to a digital filter circuit 270 that operates to provide a corresponding filtered output 273. In some embodiments of the invention, digital filter circuit 270 is a digital finite impulse response filter as are known in the art. Filtered output 273 is provided to a data processing circuit 276 that operates to decode the received data set to yield a data output 279. In some embodiments of the invention, the data processing circuit 276 includes a data detector circuit and a data decoder circuit as are known in the art. In one particular embodiment of the invention, the data detector circuit is a maximum a posteriori (MAP) data detector circuit as are known in the art, and the data decoder circuit is a low density parity check circuit as are known in the art.

Digital samples 258 are provided to a digital filter circuit 282 that operates to provide a corresponding filtered output 284. An exemplary embodiment of the digital filter circuit 282 is discussed further below in conjunction with FIG. 3. In some embodiments of the invention, digital filter circuit 282 is a digital finite impulse response (FIR) filter as are known in the art. Filtered output 284 is provided to a discrete Fourier transform circuit 286. Discrete Fourier transform circuit 286 provides multiple outputs (i.e., transformed output 288) that each correspond to a respective center frequency. By providing multiple outputs each tuned to a respective center frequency, the signal to noise ratio of a signal used to detect contact is increased. In particular, discrete Fourier transform circuit 286 is tuned to provide an output corresponding to a finite number of frequencies. The center frequencies correspond to frequency signatures indicative of contact between the read/write head assembly 176 and the storage medium 178. The defined frequency signatures are provided as a modifiable frequency signature input 297.

When a read/write head assembly 176 contacts a storage medium 178 over which the read/write head assembly 176 is disposed, head disk interface signal 206 exhibits a frequency distinguishable from surrounding noise. During a calibration process, one or more contact signatures or frequencies indicative of contact between the read/write head assembly 176 and the storage medium 178 are identified and stored. These contact signatures are provided to discrete Fourier transform circuit 286 as a frequency signature input 297. Of note, Discrete Fourier transform circuit 286 may be any circuit known in the art that is capable of applying a discrete Fourier transform to a series of digital values. Discrete Fourier transform circuit 286 provides a transformed output 288. In some cases, the outputs of frequency bins including components of a contact detection signature (i.e., a frequency signature) may be passed independently to a subsequent processing stage, or they may be used (possibly summed) together in a weighted fashion to further enhance the detection capabilities of the algorithm. Further, it should be noted that in other embodiments of the invention that an infinite impulse response (IIR) filter may be used in place of discrete Fourier transform circuit 286.

Transformed output 288 is provided to a multi-level threshold processing circuit 290. An exemplary three-level implementation of the multi-level threshold detector 290 is discussed further below in conjunction with FIG. 7. Multi-level threshold processing circuit 290 performs different level processes that include determining whether any values of transformed output 288 correspond to a defined contact signature, and that the defined contact signature is continued for a defined period. In addition, a contact or touchdown qualifier can optionally be employed in a third level detection, based on a prioritized groupings of frequency bins. A first bin group can require that all of the bins in the group are asserted for the second level (window threshold) results before a contact event can be declared (i.e., all of the bins in the group must be triggered before a contact event is declared). In addition, a second bin group can require that a predefined minimum number of the remaining bins are asserted for the second level (window threshold) results before a contact event can be declared.

To do this, multi-level threshold processing circuit 290 compares the multiple frequency indicators provided as the transformed output 288 to level thresholds. Such first level threshold detection compares the respective frequency bin outputs of transformed output 288 to one or more level threshold values. In some cases, these level threshold values are programmable. Where a given one of the frequency bin outputs of transformed output 288 exceeds the corresponding level threshold, an indication of a potential contact corresponding to the given frequency is asserted.

It is then determined during a second level threshold detection whether the threshold is exceeded for a defined period corresponding to a window width input 298. Where the threshold remains for a length of time defined by the window width input 298, the previously determined potential contact is confirmed causing a filter result output 292 to be asserted. In one particular embodiment, determining that the threshold remains for the length of time defined by the window width input 298 is done by summing the values of the respective frequency bin outputs of transformed output 288 over the window period, and comparing the resulting aggregate value against an aggregate threshold. Where the aggregate threshold is exceeded, the previously determined potential contact is confirmed causing a filter result output 292 to be asserted. In some cases, the aggregate threshold is programmable. It is important to note that in the case of utilizing multiple individual signals from selected frequency bins in the first threshold comparison, that the results after comparing each signal to the aggregate threshold may be combined (for example, by a summation, a weighted summation, or an 'OR' operation) to further enhance the detection capability of the algorithm.

It should be noted that the level threshold values, the aggregate threshold value, and the window width value may be set independently for each frequency bin output, or may be designed to depend from each other. The selection of the level threshold values, the aggregate threshold value, and the window width value govern the operation of contact detection system 200. The level threshold should be selected to ensure contact events are identified. Both window width and aggregate threshold may be determined as the lowest settings to allow reliable detection without false positives, namely detecting a contact event when none has occurred. One method of optimizing selection of these three parameters for a contact event detection involves setting the sensor height—through setting of a fly height control (FHC) heater—high enough to ensure no touchdown or contact, and then calibrating the settings to the lowest settings that give no false positives. Then, the fly height control setting is slowly reduced. At each step down, the parameters are varied over a predetermined range to look for a contact event. If no contact event is detected, the fly height control setting is reduced and the procedure is repeated, until a contact event is detected.

In one embodiment, a third level detection is optionally performed to determine if a required set of bins are asserted for the second level (window threshold) results. In addition, a predefined minimum number of additional bins can be required to determine that a contact event has occurred.

Filter result output 292 is provided to a head disk contact detection circuit 294. Filter result output 292 is asserted whenever both transformed output 288 is exactly or near a defined signature frequency, that frequency has been maintained during the defined time period and the optional third level detection is satisfied. Otherwise, filter result output 292 is de-asserted. Where filter result 292 is asserted, head disk contact detection circuit 294 asserts a contact output 296 to a head control algorithm circuit 299. Head control algorithm circuit 299 may be any circuit known in the art that is capable of communicating a head control input 264 that is a command that causes fly height adjustment control circuit 261 to adjust the read/write head assembly 176 up and away from the storage medium 178.

In some embodiments of the invention, digital filter circuit 282, discrete Fourier transform circuit 286, multi-level threshold processing circuit 290 and head disk contact detection circuit 294 are implemented as part of a general purpose digital signal processing circuit. Such a digital signal processing circuit executes instructions maintained in a storage medium that may be, for example, a random access memory. In such cases, the operations of digital filter circuit 282, discrete Fourier transform circuit 286, multi-level threshold processing circuit 290 and head disk contact detection circuit 294 are performed by executing instructions in the digital signal processor.

In some cases, contact detection system 200 may be used to set the correct fly height control heater register settings. In such a case, in the factory, after the touchdown fly height control setting is determined, the fly height control heater register setting is reduced by a predetermined amount to allow margin for the fly height/clearance (separation between the read/write head assembly 176 and the storage medium 178). This procedure may be repeated in the field to adjust for environmental or system changes/aging that may have affected fly height or clearance. If an algorithm exists in the drive for a relative fly height change indicator, it may be used as a signal to perform a recalibration.

Figure 3:
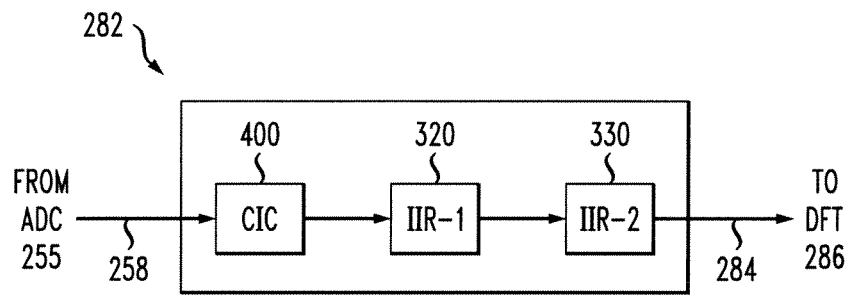
FIG. 3 illustrates an exemplary embodiment of the digital filter circuit of FIG. 2.

FIG. 3 illustrates an exemplary embodiment of the digital filter circuit 282 of FIG. 2. As shown in FIG. 3, the exemplary digital filter circuit 282 is implemented as a three-stage digital low pass filter 300 that comprises a cascaded-integrator comb (CIC) filter 400, a first infinite impulse response (IIR) filter 320 and a second IIR filter 330. The digital filter circuit 282 processes the output 258 of the ADC 255 of FIG. 2, and produces a filtered output 284 that is processed by the DFT 286 of FIG. 2.

An exemplary implementation of the CIC filter 400 is discussed further below in conjunction with FIG. 4. An exemplary implementation of the IIR filters 320 and 330 is discussed further below in conjunction with FIG. 5.

Figure 4:
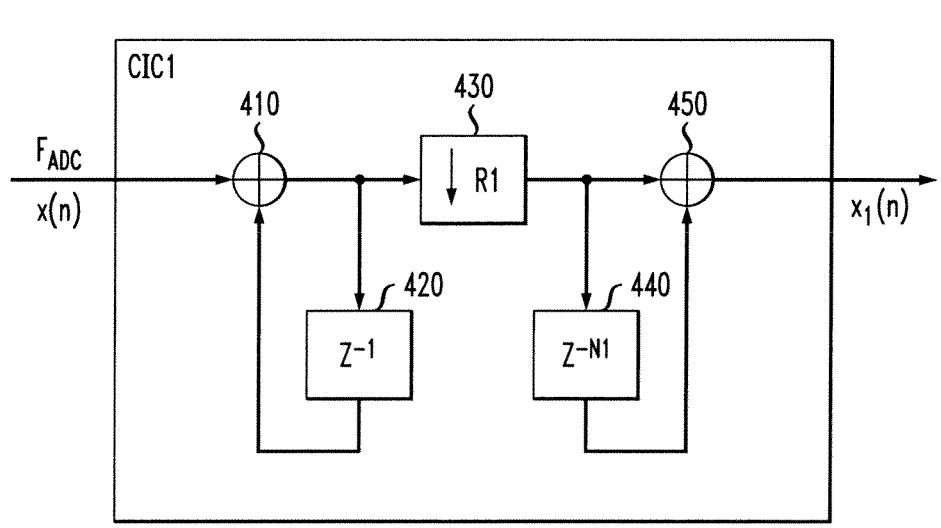
FIG. 4 illustrates an exemplary embodiment of the cascaded-integrator comb (CIC) filter of FIG. 3.

FIG. 4 illustrates an exemplary embodiment of the CIC filter 400 of FIG. 3. Generally, CIC filters, such as CIC filter 400, perform decimation and interpolation. The exemplary CIC filter 400 comprises an integrator stage clocked at $F_{ADC}$, followed by a rate change 430 by a factor R1, followed by a comb stage running at $F_{ADC}/R1$. The integrator stage comprises an adder 410 and a delay stage 420. The comb stage comprises an adder 450 and a delay stage 440. In one exemplary embodiment, CIC filter 400 has a fixed down sampling ratio (R1) of 16. Thus, R1 and N1 equal 16 in the exemplary embodiment of FIG. 4. The exemplary bit width of the input x(n) and output $x_1(n)$ for the exemplary CIC filter 400 are 6 and 7 bits, respectively.

For a more detailed discussion of CIC filters 400, see, for example, Matthew P. Donadio, "CIC Filter Introduction," http://www.dspguru.com/sites/dspguru/files/cic.pdf (July 2000), incorporated by reference herein.

Figure 5:
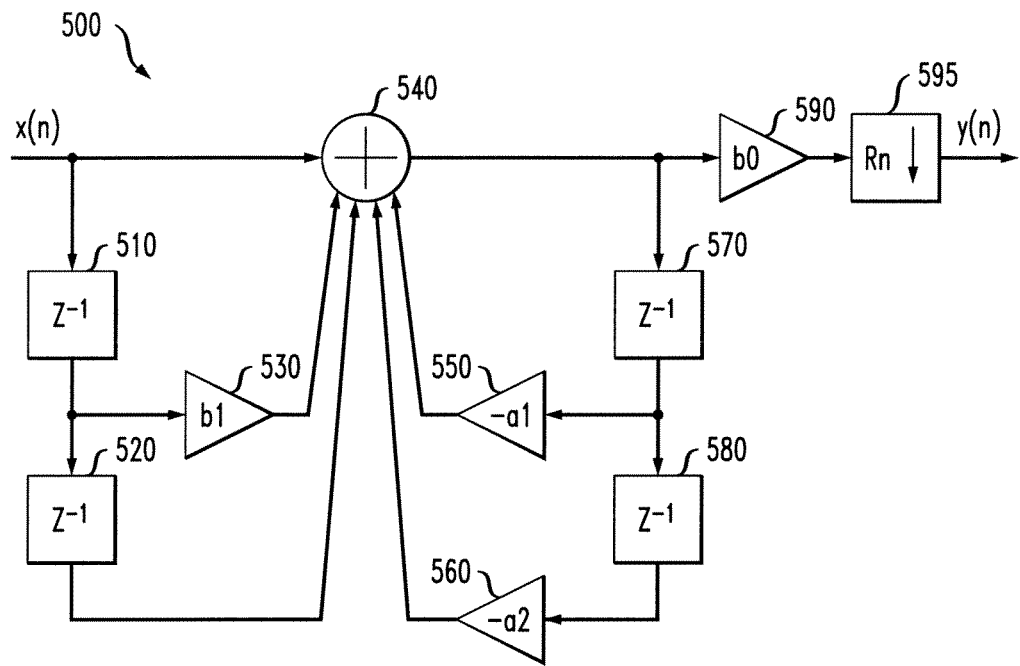
FIG. 5 illustrates an exemplary embodiment of the infinite impulse response (IIR) filter circuits of FIG. 3.

FIG. 5 illustrates an exemplary IIR filter circuit 500 that can be employed as the IIR filters 320 and 330 of FIG. 3. As shown in FIG. 5, the exemplary IIR filter circuit 500 comprises delay stages 510, 520, coefficient 530, adder 540, coefficients 550, 560, delay stages 570, 580, coefficient 590 and downsampler 595.

For example, when exemplary IIR filter 320 has a downsampling rate R2 equal to 4, the exemplary coefficients 550, 560, 590, 530 may be set as follows:

a1=−0.94336, a2=0.33398, b0=0.097656 and b1=2.

Similarly, when exemplary IIR filter 330 has a downsampling rate R3 equal to 4, the exemplary coefficients 550, 560, 590, 530 may be set as follows:

a1=−0.94336, a2=0.33398, b0=0.097656 and b1=2.

In one exemplary embodiment of FIG. 5, IIR filters 320 and 330 have an input and output with bit widths of 7 bits.

Figure 6:
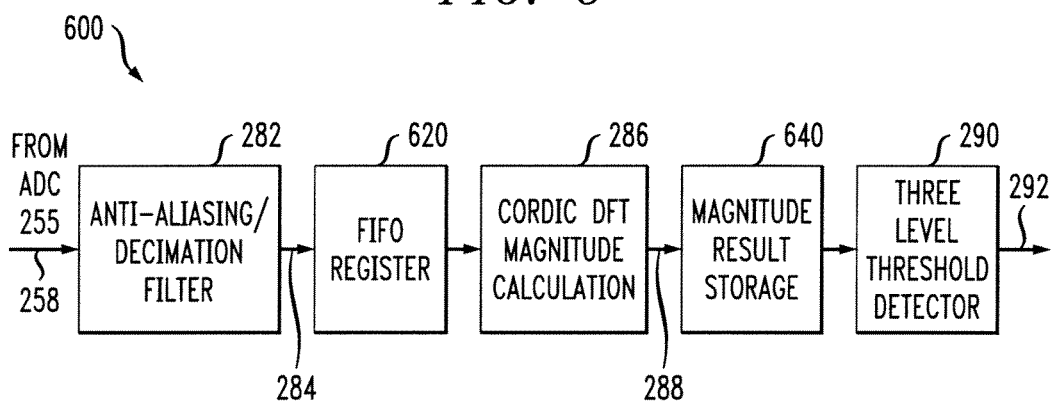
FIG. 6 illustrates portions of the contact detection system of FIG. 2 in further detail.

FIG. 6 illustrates portions 600 of the contact detection system 200 of FIG. 2 in further detail. As shown in FIG. 6, the illustrated portions 600 of the contact detection system 200 comprise an anti-aliasing/decimation filter 282, a FIFO register 620, a DFT magnitude calculation block 286, a magnitude result storage block 640 and a three-level threshold detector 290.

Generally, the anti-aliasing portion of filter 282 prepares the signal 25 sampling and the decimation portion of filter 282 determines how many samples to save. The FIFO register 620 stores the samples from the anti-aliasing/decimation filter 282. For an exemplary 128 point DFT, once 128 samples are available in the FIFO register 620, a DFT computation is initiated in the DFT magnitude calculation block 286. The exemplary DFT magnitude calculation block 286 is based on the CORDIC (Coordination Rotation Digital Computer) algorithm. Each DFT magnitude bin will be computed in sequence by the DFT magnitude calculation block 286 and stored into a register in the magnitude result storage block 640.

DFT magnitude calculation block 286 provides multiple outputs (i.e., transformed output 288) that each correspond to a respective center frequency. By providing multiple outputs each tuned to a respective center frequency, the signal to noise ratio of a signal used to detect a contact event is increased. In particular, discrete Fourier transform circuit 286 is tuned to provide an output corresponding to a finite number of frequencies. The center frequencies correspond to frequency signatures indicative of a contact event between the read/write head assembly and the storage medium. For example, each DFT bin may be computed using the following equation:

$$X(k) = \sum_{n=1}^{N} x(n) \exp\left\{-j\frac{2\pi}{N}(n-1)(k-1)\right\}, 1 \leq k \leq N$$

$$= \sum_{n=1}^{N} x(n)\left[\cos\left(\frac{2\pi}{N}t\right) - j\sin\left(\frac{2\pi}{N}t\right)\right], t = (n-1)(k-1).$$

For an exemplary 128 point DFT, there are effectively 64 bins, each representing a narrow band of frequency strength. It has been shown that the touchdown (TD) signature shows up between 100 Khz~500 Khz. A subset of the DFT bins can optionally be selectively computed that show the touch-down signature. In one exemplary embodiment, the DFT computation can be simplified using a cos(x) function lookup table (LUT). By utilizing the function cos(x) symmetrical property, data is only needed for 32 bins to compute a 128 point DFT. The remaining data can be computed using cosine properties, in a known manner.

Once all exemplary 64 magnitude bins have been computed, the three-level threshold detector 290 is initiated. An exemplary three-level threshold detector 290 is discussed in conjunction with FIG. 7.

Figure 7:
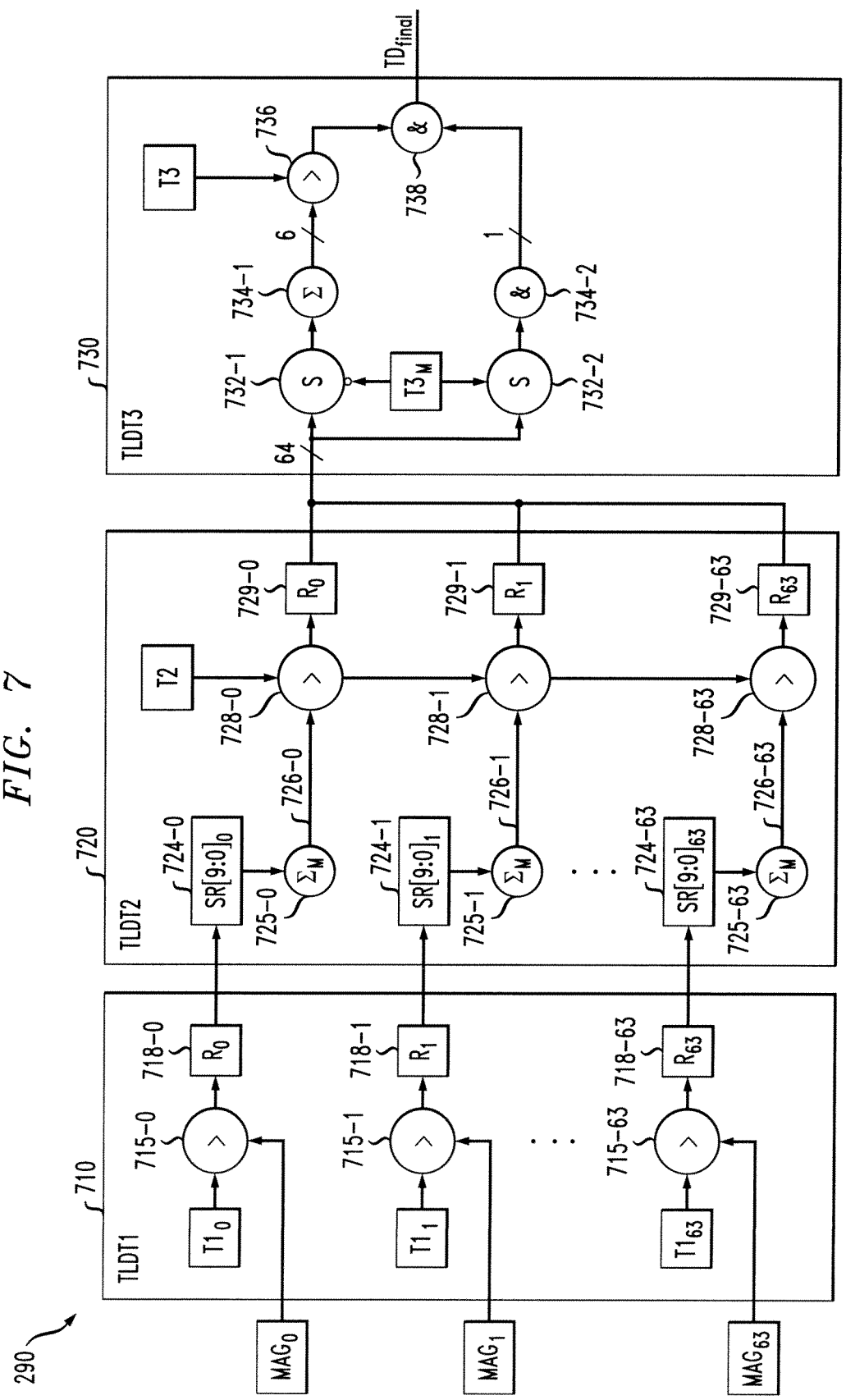
FIG. 7 illustrates an exemplary three-level embodiment of the multi-level threshold detector of FIG. 2.

FIG. 7 illustrates an exemplary three-level embodiment of the multi-level threshold detector 290 of FIG. 2. As shown in FIG. 7, an exemplary three-level embodiment of the multi-level threshold detector 290 for 64 bins comprises a plurality of level threshold value comparator circuits 715-0 through 715-63 in a first level threshold detector TLDT1 (710) that compare respective first level threshold values $T1_0$ through $T1_{63}$ with corresponding transformed magnitude outputs $MAG_0$ through $MAG_{63}$. For example, level threshold value comparator circuit 715-0 compares transformed output $MAG_0$ with first level threshold value $T1_0$. Where a given transformed output MAG is greater than the corresponding first level threshold value T1, a corresponding preliminary contact indication is asserted and stored in a corresponding register $R_0$ through $R_{63}$ (718-0 through 718-63), otherwise it is de-asserted (which effectively disables the corresponding bin from being considered in the second level threshold detector TLDT2). The output of each register $R_0$ through $R_{63}$ (718-0 through 718-63) is provided to a second level threshold detector TLDT2 (720). Once all TLDT1 values are computed, the second level threshold detector TLDT2 can be signaled to commence operation.

Mathematically, the first level detection result can be expressed as follows:

$$TD_1(k, n) = \begin{cases} 1 & \text{if } DFT(k, n) > TD_{threshold}(k)(T1) \\ 0 & \text{otherwise} \end{cases}$$

Each DFT bin will generate either a 1 or a 0 at the output of the bin detector.

The second level threshold detector TLDT2 (720) comprises a plurality of shift registers 724-0 through 724-63 that store bits provided as preliminary contact indications from the registers 718 of TLDT1 within a bit window, such as a 10 bit window in the exemplary embodiment of FIG. 7. A plurality of adders 725-0 through 725-63 aggregate the values stored in corresponding shift registers 724-0 through 724-63 to generate corresponding aggregate outputs 726-0 through 726-63. In addition, the second level threshold detector TLDT2 (720) comprises a plurality of level threshold value comparator circuits 728-0 through 728-63 that compare respective aggregate outputs 726 of adders 725-0 through 725-63 with an aggregate threshold value T2. Where the resulting aggregate outputs 726 of adders 725-0 through 725-63 exceed the aggregate threshold value T2, the second level threshold value comparator circuit 728 asserts an aggregate output that is stored in a corresponding register $R_0$ through $R_{63}$ (729-0 through 729-63). Once TLDT2 has computed all values, a third level threshold detector TLDT3 is signaled to commence operation.

Mathematically, the second level detection result can be expressed as follows:

$$TD_2(k) = \begin{cases} 1 & \text{if } \sum_{m=1}^{M} TD_1(k, m) > TD_{win\_threshold}(T2) \\ 0 & \text{otherwise} \end{cases}$$

where M is a window length and $TD_{win\_threshold}$ is the window threshold (T2). Generally, a potential touchdown (TD) is declared in the second level if the averaged first level TD result $TD_1$ (k, n) is larger than $TD_{win\_threshold}$ within the window.

As shown in FIG. 7, the one-bit outputs of registers $R_0$ through $R_{63}$ (729-0 through 729-63) are provided to a third level threshold detector TLDT3 (730) that processes the bins in two prioritized groups as a contact qualifier. A first bin group can require that all of the bins in the group are asserted for the second level (window threshold) results before a contact event can be declared. In addition, a second bin group can require that a predefined minimum number of additional bins in the group are asserted for the second level (window threshold) results before a contact event can be declared. The TLDT2 results for the bins in the second group are summed and compared to a threshold 13.

In the exemplary embodiment of FIG. 7, a $T3_M$ qualifier is used to classify the bins in each group by providing a list of the bins in each group. For example, bins in the first group can have a binary value of 1 and bins in the second group can have a binary value of 0. In another variation, the $T3_M$ qualifier is a list of the bins in one group, and the excluded bins are part of the second group. In the exemplary embodiment of FIG. 7, the $T3_M$ qualifier is a list of bins in the first group. Two exemplary selection functions 732-1 and 732-2 (selection function 732-1 has an inverted input) separate the bins into two groups. The second group is selected by the selection function 732-1 having an inverted input (the selection function 732-1 serves to exclude the bins that are not listed by the $T3_M$ qualifier list). The results for the bins in the second group are summed by adder 734-1 and compared to a threshold T3 by a comparator 736. The second bin group requires that a predefined minimum number of bins (specified by T3) in the group are asserted for the second level (window threshold) results before a contact event can be declared.

The first group specified by the $T3_M$ qualifier list is selected by the selection function 732-2. The first bin group requires that all of the bins in the group must be asserted for the second level (window threshold) results before a contact event can be declared. The results for the bins in the first group are thus applied to an AND function 734-2 to determine if all of the bins in the first group have been asserted.

The outputs of the two groups are applied to an AND function 738 to determine the final contact event output. Mathematically, the final contact event or TD decision, $TD_{final}$, can be expressed as follows:

$$TD_{final} = ((\Sigma_{Group2} TD_2(k)) > TD_{sum_{threshold}}(T3)) \&\& (\pi_{group1} TD_2(k))$$

For alternate two-level implementations of the multi-level threshold detector 290 of FIG. 2, see U.S. patent application Ser. No. 13/031,671, filed Feb. 22, 2011, entitled "Systems and Methods for Medium Contact Detection," incorporated by reference herein.

As previously indicated, the arrangements of magnetic recording systems and read channels, as described herein, provide a number of capabilities not available in conventional arrangements. Again, it should be emphasized that the above-described embodiments of the invention are intended to be illustrative only. In addition, the disclosed contact event detection techniques can be employed in any magnetic recording system, such as a virtual storage system/storage virtualization system, such as a Redundant Array of Independent Disks (RAID) system.

While exemplary embodiments of the invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Thus, embodiments of the invention can be manifest in the form of methods and apparatuses for practicing those methods. One or more embodiments of the invention can be manifest in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. Embodiments of the invention can also be implemented in one or more of an integrated circuit, a digital signal processor, a microprocessor, and a micro-controller.

For example, one aspect of the invention provides a tangible machine-readable recordable storage medium for detecting a contact event between a sensing device and a storage medium, wherein one or more software programs when executed by one or more processing devices implement the steps described herein.

Given the teachings of embodiments of the invention provided herein with reference to the accompanying drawings, it is to be understood that embodiments of the invention are not limited to the described embodiments, and one of ordinary skill in the art will be able to contemplate various other embodiments of the invention within the scope of the following claims.

We claim:

1. A method for detecting a contact event between a sensing device and a storage medium, comprising:
   receiving a signal operable to indicate a physical proximity between the sensing device and the storage medium;
   processing a data set derived from the signal to generate a plurality of frequency bin outputs;
   comparing one or more frequency bin outputs to a corresponding level threshold to yield a corresponding comparator output;
   summing the comparator output with at least one prior instance of the comparator output to yield an aggregated value;
   comparing the aggregated value to an aggregate threshold to yield an aggregate output; and
   generating a contact event output if one or more of a first group of the plurality of frequency bin outputs has an associated aggregate output set to a predefined binary value and a predefined minimum number of a second group of the plurality of frequency bin outputs has an associated aggregate output set to a predefined binary value.

2. The method of claim 1, wherein the comparator output is asserted to indicate the corresponding frequency bin output is greater than the corresponding level threshold, and wherein the aggregate output is asserted to indicate that the aggregated value is greater than the aggregate threshold.

3. The method of claim 1, wherein the signal provides a contact signature when the sensing device is within a predefined physical proximity to the storage medium.

4. The method of claim 1, wherein the method further comprises:
   converting a derivative of the signal to a series of digital samples, and wherein the data set is derived from the series of digital samples.

5. The method of claim 4, wherein the method further comprises the step of digitally filtering the series of digital samples to yield the data set.

6. The method of claim 5, wherein the step of digitally filtering the series of digital samples further comprises the step of applying the digital samples to a cascaded-integrator comb filter and at least one infinite impulse response filter.

7. The method of claim 1, wherein the step of processing the data set further comprises the step of applying a coordination rotation digital Computer discrete Fourier Transform algorithm to the data set.

8. The method of claim 1, wherein a center frequency of each frequency bin output corresponds to a contact signature.

9. The method of claim 1, wherein the sensing device is operable to provide the signal.

10. The method of claim 1, wherein the number of prior instances of the comparator output that are included in the aggregated value corresponds to a programmable window width value.

11. The method of claim 1, wherein the first group of the plurality of frequency bin outputs comprises frequency bin outputs that must be asserted.

12. The method of claim 1, wherein the step of generating a contact event output further comprises generating a contact event output only if the first group of the plurality of frequency bin outputs has been asserted and the predefined minimum number of a second group of the plurality of frequency bin outputs has been asserted.

13. A non-transitory machine-readable recordable storage medium for detecting a contact event between a sensing device and a storage medium, wherein one or more software programs when executed by one or more processing devices implement the following steps:
 receiving a signal operable to indicate a physical proximity between the sensing device and the storage medium;
 processing a data set derived from the signal to generate a plurality of frequency bin outputs;
 comparing one or more frequency bin outputs to a corresponding level threshold to yield a corresponding comparator output;
 summing the comparator output with at least one prior instance of the comparator output to yield an aggregated value;
 comparing the aggregated value to an aggregate threshold to yield an aggregate output; and
 generating a contact event output if one or more of a first group of the plurality of frequency bin outputs has an associated aggregate output set to a predefined binary value and a predefined minimum number of a second group of the plurality of frequency bin outputs has an associated aggregate output set to a predefined binary value.

14. A system for detecting a contact event between a sensing device and a storage medium, comprising:
 an input that receives a signal operable to indicate a physical proximity between the sensing device and the storage medium;
 a Discrete Fourier transform circuit that processes a data set derived from the signal to generate a plurality of frequency bin outputs;
 one or more comparators for comparing one or more frequency bin outputs to a corresponding level threshold to yield a corresponding comparator output;
 an adder for summing the comparator output with at least one prior instance of the comparator output to yield an aggregated value;
 one or more comparators for comparing the aggregated value to an aggregate threshold to yield an aggregate output; and
 a multi-level threshold processing circuit for generating a contact event output if one or more of a first group of the plurality of frequency bin outputs has an associated aggregate output set to a predefined binary value and a predefined minimum number of a second group of the plurality of frequency bin outputs has an associated aggregate output set to a predefined binary value.

15. The system of claim 14, wherein the comparator output is asserted to indicate the corresponding frequency bin output is greater than the corresponding level threshold, and wherein the aggregate output is asserted to indicate that the aggregated value is greater than the aggregate threshold.

16. The system of claim 14, wherein the system further comprises an analog to digital converter for converting a derivative of the signal to a series of digital samples, and wherein the data set is derived from the series of digital samples.

17. The system of claim 16, wherein the system further comprises a digital filter to filter the series of digital samples to yield the data set.

18. The system of claim 17, wherein the digital filter comprises a cascaded-integrator comb filter and at least one infinite impulse response filter.

19. The system of claim 14, wherein the Discrete Fourier transform circuit comprises a CORDIC discrete Fourier Transform circuit.

20. The system of claim 14, wherein a center frequency of each frequency bin output corresponds to a contact signature.

21. The system of claim 14, wherein the sensing device is operable to provide the signal.

22. The system of claim 14, wherein the number of prior instances of the comparator output that are included in the aggregated value corresponds to a programmable window width value.

23. The system of claim 14, wherein the first group of the plurality of frequency bin outputs comprises frequency bin outputs that must be asserted.

24. The system of claim 14, wherein the multi-level threshold processing circuit generates a contact event output only if the first group of the plurality of frequency bin outputs has been asserted and the predefined minimum number of a second group of the plurality of frequency bin outputs has been asserted.

25. A system for detecting a contact event between a sensing device and a storage medium, comprising:
 a memory; and
 at least one hardware device, coupled to the memory, operative to:
 receive a signal operable to indicate a physical proximity between the sensing device and the storage medium;
 process a data set derived from the signal to generate a plurality of frequency bin outputs;
 compare one or more frequency bin outputs to a corresponding level threshold to yield a corresponding comparator output;
 sum the comparator output with at least one prior instance of the comparator output to yield an aggregated value;
 compare the aggregated value to an aggregate threshold to yield an aggregate output; and
 generate a contact event output if one or more of a first group of the plurality of frequency bin outputs has been asserted and a predefined minimum number of a second group of the plurality of frequency bin outputs has been asserted.

* * * * *